(12) United States Patent
Chang et al.

(10) Patent No.: US 11,227,557 B2
(45) Date of Patent: Jan. 18, 2022

(54) DISPLAY DEVICE

(71) Applicant: E Ink Holdings Inc., Hsinchu (TW)

(72) Inventors: Chia-Chi Chang, Hsinchu (TW); Chih-Chun Chen, Hsinchu (TW); Chi-Ming Wu, Hsinchu (TW); Yi-Ching Wang, Hsinchu (TW); Jia-Hung Chen, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 0 days.

(21) Appl. No.: 16/952,102

(22) Filed: Nov. 19, 2020

(65) Prior Publication Data

US 2021/0150991 A1    May 20, 2021

(30) Foreign Application Priority Data

Nov. 20, 2019  (TW) .................................. 108142204

(51) Int. Cl.
*G09G 3/34*     (2006.01)
(52) U.S. Cl.
CPC ..................................... *G09G 3/344* (2013.01)
(58) Field of Classification Search
None
See application file for complete search history.

(56) References Cited

U.S. PATENT DOCUMENTS

| | | | | |
|---|---|---|---|---|
| 6,043,971 A | * | 3/2000 | Song | G02F 1/136204 349/40 |
| 6,128,051 A | * | 10/2000 | Kim | G02F 1/136204 349/40 |
| 6,774,884 B2 | * | 8/2004 | Shimoda | G02F 1/1679 345/107 |
| 7,466,387 B2 | | 12/2008 | Kim et al. | |
| 7,580,107 B2 | | 8/2009 | Moon | |
| 7,626,670 B2 | | 12/2009 | Park | |
| 7,821,588 B2 | | 10/2010 | Chang et al. | |
| 7,868,986 B2 | | 1/2011 | You | |
| 7,868,988 B2 | | 1/2011 | Kim et al. | |
| 9,893,139 B2 | | 2/2018 | Kim et al. | |
| 9,985,227 B2 | | 5/2018 | Oh et al. | |

(Continued)

FOREIGN PATENT DOCUMENTS

| | | |
|---|---|---|
| TW | 201241531 A | 10/2012 |
| TW | 201423537 A | 6/2014 |

(Continued)

OTHER PUBLICATIONS

Corresponding Taiwan office action dated Jun. 22, 2020.

*Primary Examiner* — Matthew Yeung
(74) *Attorney, Agent, or Firm* — CKC & Partners Co., LLC

(57) ABSTRACT

The present disclosure provides a display device. The display device includes a substrate, a pixel array, a circuit bridge structure, a first trace region, a second trace region, and a display film layer. The pixel array is located on the substrate. The circuit bridge structure is located at one side of the pixel array. The first trace region is located between the pixel array and a first side of the circuit bridge structure. The second trace region is located at a second side opposite to the first side. The display film layer is located on the pixel array, and an orthogonal projection of the display film layer on the substrate is spaced apart from an orthogonal projection of the circuit bridge structure on the substrate.

14 Claims, 4 Drawing Sheets

(56) References Cited

U.S. PATENT DOCUMENTS

| | | |
|---|---|---|
| 10,032,847 B2 | 7/2018 | Jeon |
| 2005/0062912 A1 | 3/2005 | Otake |
| 2006/0232738 A1 | 10/2006 | Lin et al. |
| 2006/0244892 A1* | 11/2006 | Asai ................. G02F 1/136204 349/151 |
| 2009/0179204 A1 | 7/2009 | You |
| 2014/0184989 A1* | 7/2014 | Park ................... G02F 1/13452 349/84 |
| 2016/0240457 A1 | 8/2016 | Lee |
| 2019/0163322 A1 | 5/2019 | Lee et al. |

FOREIGN PATENT DOCUMENTS

| | | |
|---|---|---|
| TW | 201430451 A | 8/2014 |
| TW | 201523107 A | 6/2015 |

\* cited by examiner

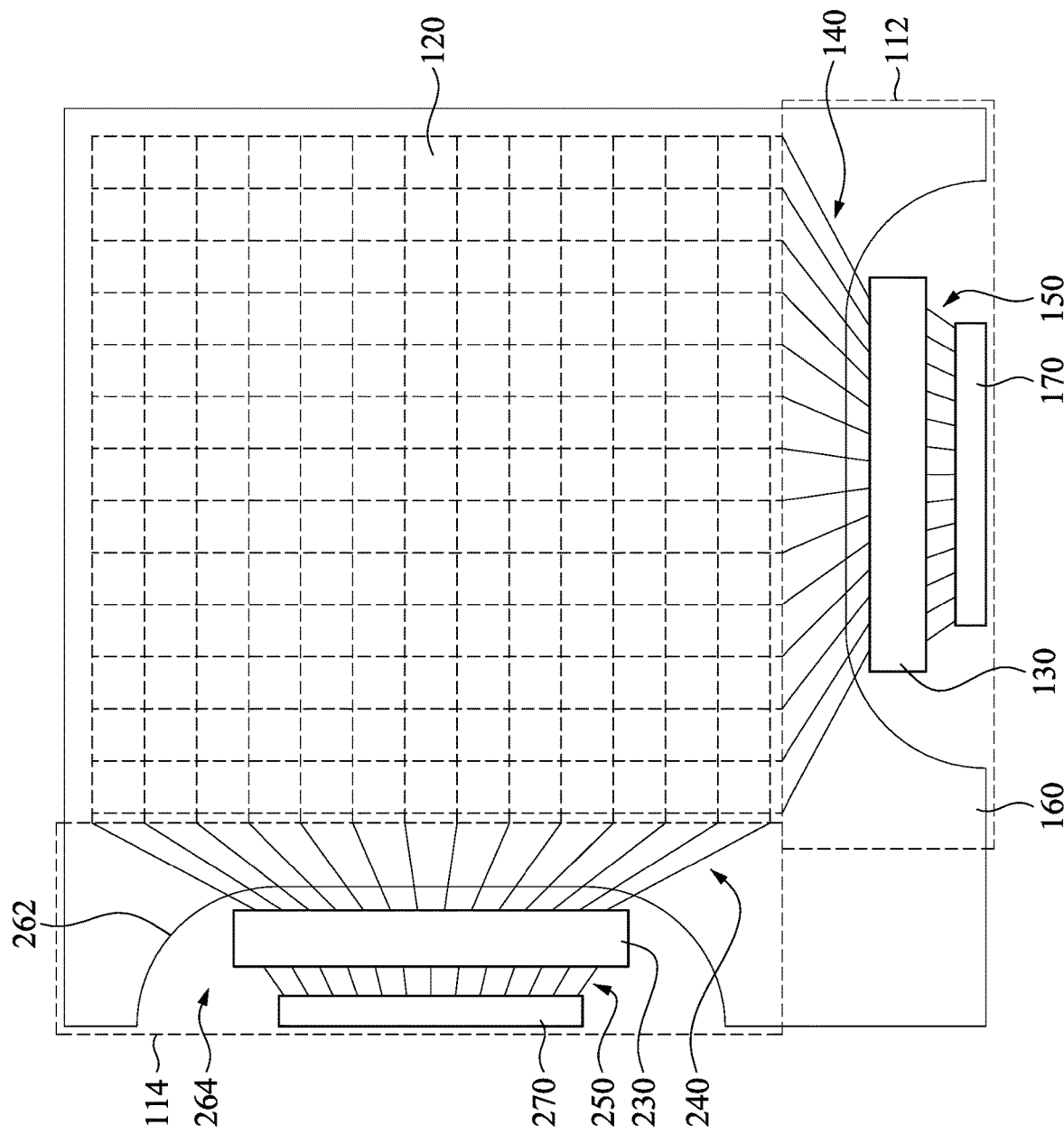

DISPLAY DEVICE

RELATED APPLICATIONS

This application claims priority to Taiwan Application Serial Number 108142204, filed Nov. 20, 2019, which is herein incorporated by reference.

BACKGROUND

Technical Field

The present disclosure relates to a display device.

Description of Related Art

Nowadays, among various electronic devices, electronic paper has been applied as display devices for small size billboard. The electronic ink layer of the electronic paper includes electrophoresis solution and white, black, or color particles suspended in it. By applying voltage to the display medium layer, these particles may be driven to move so as to display black, white, grayscale or color at each pixel.

In general, a pixel array and a fan-out trace of the display device both have circuit bridge structure, and the pixel array of the circuit bridge structure may be connected to an external device (e.g., integrated circuit IC) through contact holes. However, the microcapsule or microcups in the electronic ink layer may has possibilities to be broken which causes leaking of electrophoresis solution. Electrochemistry reaction may occur when the metal material of contact holes (e.g., ITO) is in contact with the electrophoresis solution which makes the contact hole be eroded and produce defects such that the display figure is incomplete at the edge of the display device.

Therefore, how to provide a display device that may resolve the problems above is a study issue of which the current industry involves with.

SUMMARY

One aspect of the present disclosure is a display device.

According to some embodiments of the present disclosure, a display device includes a substrate, a pixel array, a circuit bridge structure, a first trace region, a second trace region, and a display film layer. The pixel array is located on the substrate. The circuit bridge structure is located at one side of the pixel array. The first trace region is located between the pixel array and a first side of the circuit bridge structure. The second trace region is located at a second side opposite to the first side. The display film layer is located on the pixel array. An orthogonal projection of the display film layer on the substrate is spaced apart from an orthogonal projection of the circuit bridge structure on the substrate.

In some embodiments, the orthogonal projection of the display film layer on the substrate is partially overlapped with an orthogonal projection of the first trace region on the substrate.

In some embodiments, the orthogonal projection of the display film layer on the substrate is spaced apart from an orthogonal projection of the second trace region on the substrate.

In some embodiments, an orthogonal projection of an edge of the display film layer on the substrate is located between the pixel array and the circuit bridge structure.

In some embodiments, the circuit bridge structure includes a contact hole electrically connected with the first trace region and the second trace region.

In some embodiments, the circuit bridge structure is electrically connected with the first trace region and the second trace region.

In some embodiments, the display device further includes a connection pad, and the second trace region is located between the connection pad and the circuit bridge structure.

In some embodiments, an orthogonal projection of the connection pad on the substrate is spaced apart from the orthogonal projection of the circuit bridge structure on the substrate.

In some embodiments, an orthogonal projection of the connection pad on the substrate is spaced apart from the orthogonal projection of the display film layer on the substrate.

In some embodiments, the display film layer includes a notch, and the connection pad is exposed from the notch.

In some embodiments, the display film layer includes a notch, and the circuit bridge structure is exposed from the notch.

In some embodiments, the display film layer includes a notch, and the second trace region is exposed from the notch.

In some embodiments, a number of circuit bridge structure is two, the two circuit bridge structures are respectively located at adjacent two edges of the pixel array, the display device further includes a third trace region, the first trace region and the second trace region are respectively located between the two circuit bridge structures and two edges of the pixel arrays, and the orthogonal projection of the display film layer on the substrate is spaced apart from the orthogonal projection of the two circuit bridge structures on the substrate.

In some embodiments, orthogonal projections of adjacent two edges of the display film layer on the substrate are respectively located between the two edges of the pixel array and the two circuit bridge structures.

In some embodiments, the display film layer includes electrophoreses material.

According to the foregoing embodiments, since the orthogonal projection of the display film layer on the substrate is spaced apart from the orthogonal projection of the circuit bridge structure on the substrate, the circuit bridge structure may be away from the display film layer. As such, when the microcapsules of the electrophoresis material of the display film layer are broken such that the electrophoresis solution is leaked, the structure of the present disclosure may prevent the circuit bridge structure from being eroded by the electrophoresis solution. In other words, through the design of the two-sections trace region (i.e. the first trace region and the second region), the metal (e.g., metal layer of the contact hole) in the circuit bridge structure can be prevented from being eroded by the electrophoresis solution that may produce defect in the display device that causes incomplete figure display problem.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiments, with reference made to the accompanying drawings as follows:

FIG. 4 is an enlarged view of the display panel in FIG. 3.

DETAILED DESCRIPTION

Figure 1:
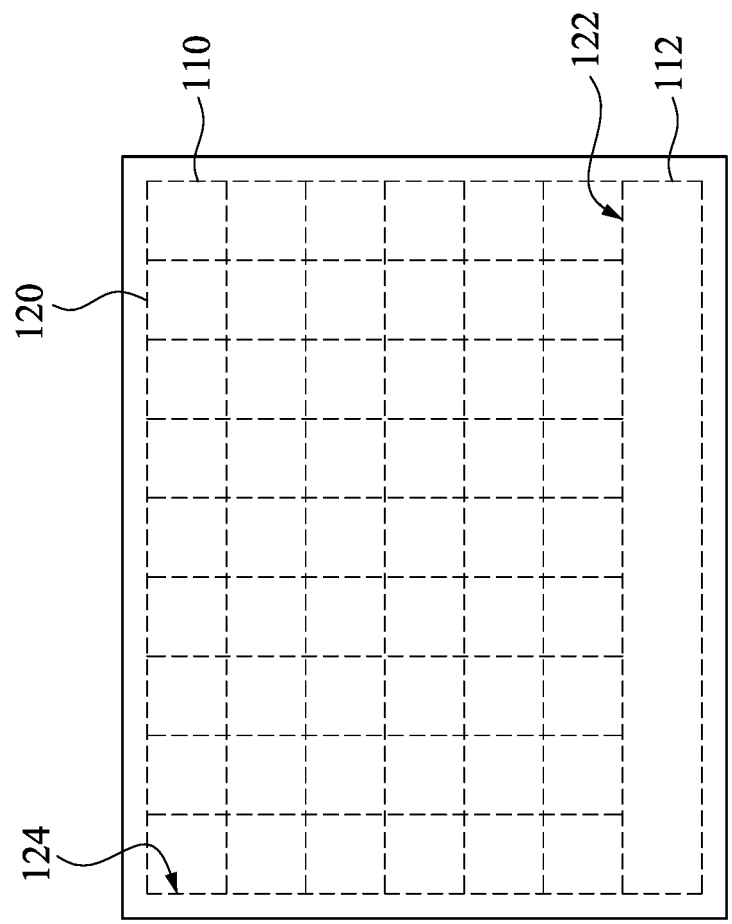
FIG. 1 is a top view of a display device according to one embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

Figure 2:
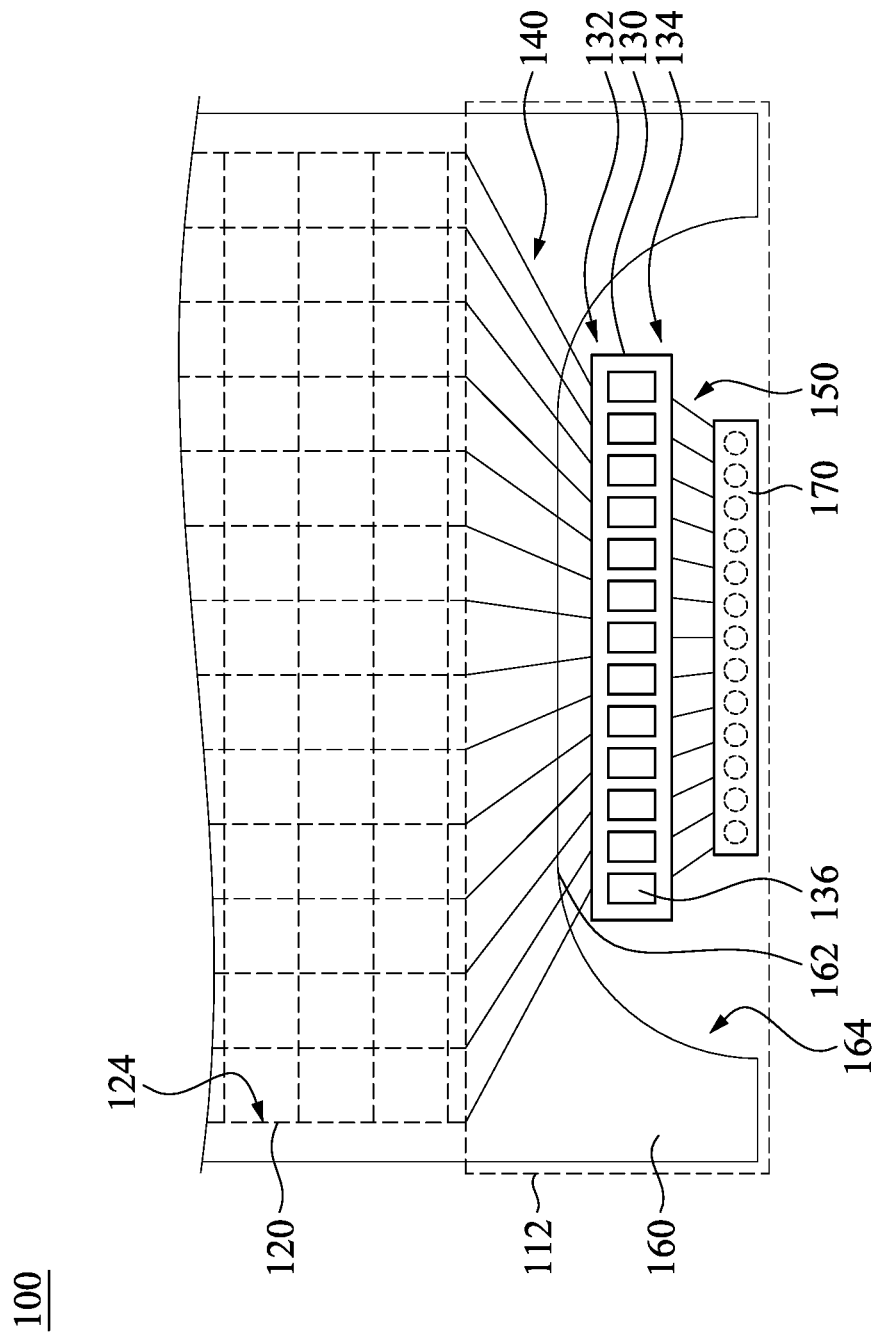
FIG. 2 is a partial enlarged view of the display panel in FIG. 1.

FIG. 1 is a top view of a display device 100 according to one embodiment of the present disclosure. FIG. 2 is a partial enlarged view of the display panel 100 in FIG. 1. Reference is made to FIG. 1 and FIG. 2, the display device 100 includes a substrate 110, a pixel array 120, a fan-out trace region 112, and a display film layer 160. The pixel array 120 is located on the substrate 110. The fan-out trace region 112 is located at a first edge 122 of the pixel array 120 so as to be electrically connected with an integrated circuit (IC). The display device 100 may be an electrophoresis display device, for example, electronic paper display device. The display film layer 160 includes electrophoresis material, for example, microcapsule or microcup.

As shown in FIG. 2, the fan-out trace region 112 includes a circuit bridge structure 130, a first trace region 140, and a second trace region 150. The circuit bridge structure 130 and the first trace region 140 are located at the first edge 122 of the pixel array 120. The first trace region 140 is located between the pixel array 120 and a first side 132 of the circuit bridge structure 130. The second trace region 150 is located at a second side 134 opposite to the first side 132 of the circuit bridge structure 130.

As shown in FIG. 2, the display film layer 160 is located on the pixel array 120, and an orthogonal projection of the display film layer 160 on the substrate 110 is spaced apart from an orthogonal projection of the circuit bridge structure 130 on the substrate 110. The orthogonal projection of the display film layer 160 on the substrate 110 is partially overlapped with an orthogonal projection of the first trace region 140 on the substrate 110. The orthogonal projection of the display film layer 160 on the substrate 110 is spaced apart from an orthogonal projection of the second trace region 150 on the substrate 110.

As shown in FIG. 2, the circuit bridge structure 130 includes a contact hole 136, and the contact hole 136 is electrically connected with the first trace region 140 and the second trace region 150. Specifically, the circuit bridge structure 130, for example, may be a common electrode, a ESD protection diode circuit, or any circuit bridge device having contact holes. In other words, the display film layer 160 does not cover the contact hole 136.

As shown in FIG. 2, the display device 100 further includes a connection pad 170, and the second trace region 150 is located between the connection pad 170 and the circuit bridge structure 130. An orthogonal projection of the connection pad 170 on the substrate 110 is spaced apart from the orthogonal projection of the circuit bridge structure 130 on the substrate 110. The orthogonal projection of the connection pad 170 on the substrate is spaced apart from the orthogonal projection of the display film layer 160 on the substrate 110.

The display film layer 160 further includes an edge 162. The edge 162 is located in the fan-out trace region 112, and an orthogonal projection of the edge 162 on the substrate 110 is located between the pixel array 120 and the circuit bridge structure 130. That is, the orthogonal projection of the edge 162 on the substrate 110 is overlapped with the first trace region 140, but is not overlapped with the circuit bridge structure 130 and the second trace region 150.

In the present embodiment, the display film 160 includes a notch 164, and the notch 164 is defined by the edge 162. As shown in FIG. 2, the connection pad 170, the circuit bridge structure 130, and the second trace region 150 are exposed form the notch 164. In other words, the display film layer 160 merely covers a portion of the first trace region 140, but not covers the circuit bridge structure 130 and the second trace region 150.

For example, in some embodiment, the pixel array 120 includes multiple pixel regions. With FIG. 2 as an example, the display device 100 includes a plurality of longitudinal data lines and a plurality of lateral scan lines. The data lines across the scan lines, and the data lines and the scan lines surround the pixel regions. The longitudinal data lines are connected with the first trace region 140 located at the first edge 122. The lateral scan lines may fold from the second edge 124 of the pixel array 120 to the first edge 122 of the pixel array 120. The lateral scan lines are connected with the first trace region 140 (not shown) and connected with corresponding integrated circuit through a connection pad. In other words, the circuit bridge structure 130 is spaced away from the edge 162 of the display film layer 160 through the two-sections trace region of the display device 100, such that an orthogonal projection of the circuit bridge structure having contact holes on the substrate 110 is spaced apart from the orthogonal projection of the display film layer 160 on the substrate 110.

Accordingly, since the orthogonal projection of the edge 162 of the display film layer 160 on the substrate 110 is located between the pixel array 120 and the circuit bridge structure 130, and the orthogonal projection of the display film layer 160 on the substrate 110 is spaced apart from the orthogonal projection of the circuit bridge structure 130 on the substrate 110, the contact holes 136 of the circuit bridge structure 130 may be away from the display film layer 160. As such, when the microcapsules of the electrophoresis material of the display film layer 160 is broken such that the electrophoresis solution is leaked, the structure of the present disclosure may prevent the contact hole 136 from being eroded by the electrophoresis solution. In other words, the circuit bridge structure 130 may be away from the edge 162 of the display film layer 160 by the design of the two-sections trace region (i.e. the first trace region 140 and the second region 150). Therefore, the contact hole 136 can be prevented from being eroded by the electrophoresis solution that may produce defect in the display device 100 that causes incomplete figure display problem.

Figure 3:
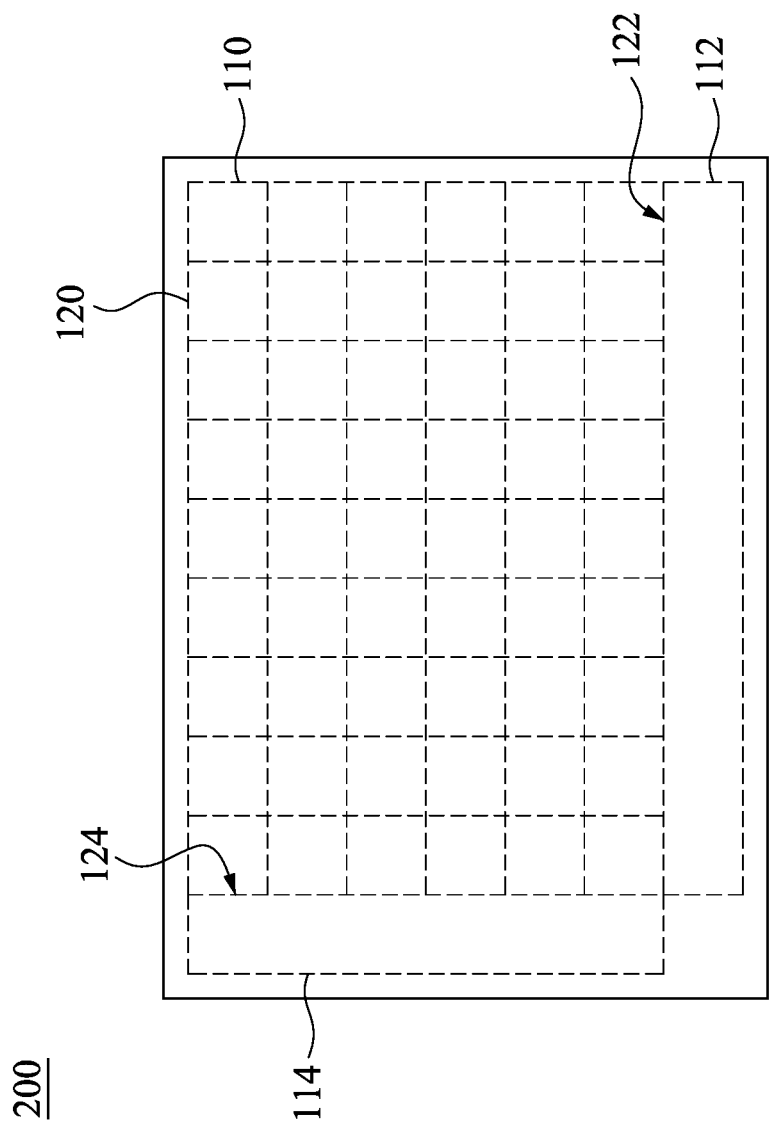
FIG. 3 is a top view of a display device according to another embodiment of the present disclosure.

FIG. 3 is a top view of a display device according to another embodiment of the present disclosure 200. FIG. 4 is an enlarged view of the display panel 200 in FIG. 3. In the present embodiment, the display 200 includes a substrate 110, a pixel array 120, a fan-out trace region 112, 114, and a display film layer 160. The pixel array 120 has a first edge 122 and a second edge 124 adjacent to the first edge 122. The fan-out region 122 is located at the first edge 122 of the pixel array 120, and the fan-out region 114 is located at the second edge 124 of the pixel array 120.

In the present embodiment, the fan-out region 114 has similar structure as the fan-out region 112. For example, as shown in FIG. 4, the circuit bridge structure 230 is located at the second edge 124 of the pixel array 120. The third trace region 240 is located between the pixel array 120 and the circuit bridge structure 230. The fourth trace region 250 is located at another side of the circuit bridge structure 230. An orthogonal projection of the display film layer 160 on the substrate 110 is spaced apart form an orthogonal projection of the circuit bridge structure 230 on the substrate 110.

In the present embodiment, the orthogonal projection of the display film layer 160 on the substrate 110 is partially overlapped with the orthogonal projection of the third trace region 240 on the substrate 110. The orthogonal projection of the display film layer 160 on the substrate 110 is spaced apart form an orthogonal projection of the fourth trace region 250 on the substrate 110.

In the present embodiment, the circuit bridge structure 230 also includes contact hole (not shown), the contact hole of the circuit bridge structure 230 are electrically connected with the third trace region 240 and the fourth trace region 250.

As shown in FIG. 4, the display device 100 further includes a connection pad 270, and the third trace region 240 is located between the connection pad 270 and the circuit bridge structure 230. An orthogonal projection of the connection pad 270 on the substrate 110 is spaced apart from the orthogonal projection of the circuit bridge structure 230 on the substrate 110. The orthogonal projection of the connection pad 270 on the substrate 110 is spaced apart from the orthogonal projection of the display film layer 160 on the substrate 110.

The display film layer 160 further includes an edge 262. The edge 262 is located at the fan-out trace region 114, and an orthogonal projection of the edge 262 on the substrate 110 is located between the pixel array 120 and the circuit bridge structure 230. That is, the orthogonal projection of the edge 262 on the substrate 110 is overlapped with the third trace region 240, but not overlapped with the circuit bridge structure 230 and the fourth trace region 250.

In the present embodiment, the display film layer 160 further includes a notch 264, and the notch 264 is defined by the edge 262. As shown in FIG. 4, the connection pad 270, the circuit bridge structure 230, and the fourth trace region 250 are exposed from the notch 264. In other words, the display film layer 160 merely covers a portion of the third trace region 240, but not cover circuit bridge structure 230 and the fourth trace region 250.

For example, in some embodiments, the display device 200 includes a plurality of longitudinal data lines and a plurality of lateral scan lines. The longitudinal data lines are connected with the first trace region 140. The lateral scan lines are directly connected with the third trace region 240. The connection pad 170 and the connection pad 270 are respectively connected with corresponding integrated circuit.

Accordingly, since the orthogonal projection of the edge 162 of the display film layer 160 on the substrate 110 is located between the pixel array 120 and the circuit bridge structure 130, the orthogonal projection of the edge 262 of the display film layer 160 on the substrate 110 is located between the pixel array 120 and the circuit bridge structure 230, the orthogonal projection of the display film layer 160 on the substrate 110 is spaced apart from the orthogonal projections of the circuit bridge structure 130 and the circuit bridge structure 230 on the substrate 110, such that the contact holes of the circuit bridge structure 130 and the circuit bridge structure 230 can be away from the display film layer 160. As such, when the microcapsules of the electrophoresis material of the display film layer 160 are broken such that the electrophoresis solution is leaked, the structure of the present disclosure may prevent the contact hole from being eroded by the electrophoresis solution. In other words, the contact hole can be prevented from being eroded by the electrophoresis solution that may produce defect in the display device that causes incomplete figure display problem by the design of the two-sections trace region.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A display device, comprising:
   a substrate;
   a pixel array located on the substrate;
   at least one circuit bridge structure located at one edge of the pixel array;
   a first trace region located between the pixel array and a first side of the circuit bridge structure;
   a second trace region located at a second side opposite to the first side of the circuit bridge structure; and
   a display film layer located on the pixel array, wherein the display film layer comprises a notch, an orthogonal projection of the display film layer on the substrate is spaced apart from an orthogonal projection of the circuit bridge structure on the substrate, and the circuit bridge structure is exposed from the notch.

2. The display device of claim 1, wherein the orthogonal projection of the display film layer on the substrate is partially overlapped with an orthogonal projection of the first trace region on the substrate.

3. The display device of claim 1, wherein the orthogonal projection of the display film layer on the substrate is spaced apart from an orthogonal projection of the second trace region on the substrate.

4. The display device of claim 1, wherein an orthogonal projection of an edge of the display film layer on the substrate is located between the pixel array and the circuit bridge structure.

5. The display device of claim 1, wherein the circuit bridge structure comprises a contact hole electrically connected with the first trace region and the second trace region.

6. The display device of claim 1, wherein the circuit bridge structure is electrically connected with the first trace region and the second trace region.

7. The display device of claim 1, further comprising:
   a connection pad, wherein the second trace region is located between the connection pad and the circuit bridge structure.

8. The display device of claim 7, wherein an orthogonal projection of the connection pad on the substrate is spaced apart from the orthogonal projection of the circuit bridge structure on the substrate.

9. The display device of claim 7, wherein an orthogonal projection of the connection pad on the substrate is spaced apart from the orthogonal projection of the display film layer on the substrate.

10. The display device of claim 1, wherein the connection pad is exposed from the notch.

11. The display device of claim 1, wherein the second trace region is exposed from the notch.

12. The display device of claim 1, wherein a number of circuit bridge structure is two, the two circuit bridge structures are respectively located at adjacent two edges of the pixel array, and the display device further comprises:
   a third trace region, wherein the first trace region and the second trace region are respectively located between the two circuit bridge structures and the two edges of the pixel arrays, and the orthogonal projection of the display film layer on the substrate is spaced apart from the orthogonal projections of the two circuit bridge structures on the substrate.

13. The display device of claim 12, wherein orthogonal projections of adjacent two edges of the display film layer on the substrate are respectively located between the two edges of the pixel array and the two circuit bridge structures.

14. The display device of claim 1, wherein the display film layer comprises electrophoreses material.

\* \* \* \* \*